United States Patent [19]
Robichaud

[11] 4,289,398
[45] Sep. 15, 1981

[54] OPTICAL TIME DOMAIN REFLECTOMETER

[76] Inventor: Roger E. Robichaud, Jemez Springs, N. Mex.

[21] Appl. No.: 965,889

[22] Filed: Dec. 4, 1978

[51] Int. Cl.³ .............................................. G01N 21/84
[52] U.S. Cl. ................... 356/73.1; 350/96.15
[58] Field of Search ............... 356/73.1, 237; 250/227; 350/96.15

[56] References Cited

U.S. PATENT DOCUMENTS

| | | | |
|---|---|---|---|
| 3,922,063 | 11/1975 | Marrone | 356/73.1 |
| 3,938,895 | 2/1976 | Bridger et al. | 250/227 |
| 3,981,592 | 9/1976 | Williams | 356/237 |
| 3,983,389 | 9/1976 | Cowardin et al. | 250/227 |
| 4,008,061 | 2/1977 | Ramsay | 350/96.15 |
| 4,012,149 | 3/1977 | Bouillie et al. | 356/237 |
| 4,021,121 | 5/1977 | Schicketanz | 356/237 |
| 4,054,366 | 10/1977 | Barnoski et al. | 350/96.15 |
| 4,070,118 | 1/1978 | Maslowski et al. | 356/237 |
| 4,083,625 | 4/1978 | Hudson | 350/96.15 |
| 4,135,779 | 1/1979 | Hudson | 350/96.15 |

OTHER PUBLICATIONS

"Photon-Probe-An Optical-Fiber Time-Domain Reflectometer" Bell Syst. Tech. Jour., vol. 56, #3, Mar. 1977, Personick, pp. 355-366.
"Optical Time Domain Reflectometer" Barnoski et al., Applied Optics, vol. 16, #9, Sep. 1977, pp. 2375-2379.
"Fiber-Optic Time Domain Reflectometer" unpublished paper by Nelson et al.

*Primary Examiner*—Vincent P. McGraw

[57] ABSTRACT

An optical time domain relectometer comprising an optical coupler which includes first and second optical fibers, each having a central core surrounded by cladding material. One end of the first optical fiber is positioned adjacent a pulsed light source and one end of the second optical fiber is positioned adjacent an optical detector. The cladding material at the other ends of the first and second optical fibers is fused together to form a composite portion wherein the central cores of the first and second fibers are closely spaced and surrounded by a continuum of cladding material. The end of the composite portion of the coupler is positioned adjacent the optical fiber waveguide under test.

7 Claims, 5 Drawing Figures

OPTICAL TIME DOMAIN REFLECTOMETER

BACKGROUND OF THE INVENTION

This invention relates to apparatus for locating discontinuities in an optical fiber waveguide or cable and, in particular, to means for coupling a light source and detector to the waveguide being tested.

The development of low-loss optical fibers has led to an increasing number of applications for light transmission systems. However, optical fibers are sometimes broken during manufacture, installation or use, and it is necessary to provide apparatus for determining the location of the break or fault accurately and quickly. Also, it is often desirable to determine the length of an unfaulted section of cable, the location of a splice or connector or the location of microcracks, bubbles or foreign inclusions sometimes produced by the manufacturing process. Accordingly, optical time domain reflectometers (OTDR) have been developed for this purpose.

In an OTDR, a high intensity light pulse, usually generated by a laser, is injected into an accessible end of the optical fiber under test. The light is transmitted through the fiber until it encounters a discontinuity such as a break, splice, connector or open end which causes some of the energy to be reflected back to the end at which the pulse was injected. The reflected energy is detected at the injection end of the fiber making it possible to determine the distance to the discontinuity. In addition to discrete reflections, there is a continuum of reflected energy called Rayleigh backscatter which can be used to measure the attenuation of the fiber and also the losses incurred at discontinuities.

One of the most critical and difficult design problems is to achieve a device which will efficiently couple light energy into one end of an optical fiber to be tested, couple energy reflected by a discontinuity in the test fiber back to a detector at the injection end of the fiber and, at the same time, prevent saturation of the detector by energy reflected from surfaces not located within the fiber under test.

More specifically, to achieve high sensitivity and resolution in an OTDR, a high intensity light source capable of generating a fast rising or short duration pulse is used in combination with a high gain, fast response photodetector. However, this combination of elements can lead to Fresnel reflection at the fiber input and to reflection of a relatively large portion of the initial light pulse energy from optical components coupling the light source and photodetector to the test fiber. While the coupling of some energy back to the photodetector from the interface with the optical fiber being tested is unavoidable (and may be used to advantage to mark the time $t_0$ at which the initial pulse enters the fiber), the combined intensity of these reflections can be much greater than the intensity of the energy reflected from a discontinuity within the test fiber. Consequently, the photodetector may be saturated by the combined reflections causing it to become insensitive to the relatively low-level reflections from discontinuities in the test fiber. Further, under saturation conditions, an optical pulse having a duration of only a few nanoseconds can produce an output signal from the photodetector of several microseconds duration thereby tending to obscure pulses reflected by discontinuities close to the injection end of the fiber.

Various attempts have been made to solve this problem. In a paper titled "Photon-Probe—An Optical-Fiber Time-Domain Reflectometer", The Bell System Technical Journal, Vol. 56, No. 3, March 1977, Personick, there is disclosed an instrument that incorporates a gated photomultiplier receiver which is turned on immediately after an undesired echo has arrived thereby preventing detector saturation by strong nearby echoes. Another system described by Barnoski et al in an article "Optical Time Domain Reflectometer" published in Applied Optics, Vol. 16, No. 9, September 1977 employs a directional taper coupling to eliminate the need for either electrical or optical gating in preventing detector saturation. Still another system is described by Nelson et al in an unpublished paper "A Fiber-Optical Time Domain Reflectometer" wherein the detection of faults close to the injection end of a test fiber is attained by using, in conjunction with a polarized beam splitter, a semiconductor laser which emits light that is polarized more in one direction than another. The Personick and Nelson et al systems require beam splitters and all employ lenses making these prior art devices relatively cumbersome and complex.

SUMMARY OF THE INVENTION

It is an object of the present invention to provide an optical time domain reflectometer employing an optical coupler of simple construction wherein the coupler does not require lenses, beam splitters or electronic components.

It is a further object of the invention to provide an efficient coupler which simultaneously couples the optical fiber waveguide to be tested to a pulsed light source and a photodetector, and wherein the photodetector is not saturated by energy from the initial light pulse.

The noval optical coupler comprises first and second optical fibers each having a central core surrounded by cladding material. One end of the first optical fiber is positioned adjacent the pulsed light source and one end of the second optical fiber is positioned adjacent the optical detector. The cladding material at the other ends of the first and second optical fibers is fused together to form a composite portion wherein the central cores of the first and second fibers are closely spaced and surrounded by a continuum of cladding material. The end of the composite portion of the coupler is positioned adjacent the optical fiber waveguide under test.

DETAILED DESCRIPTION OF THE PREFERRED EMBODIMENTS

Figure 1:
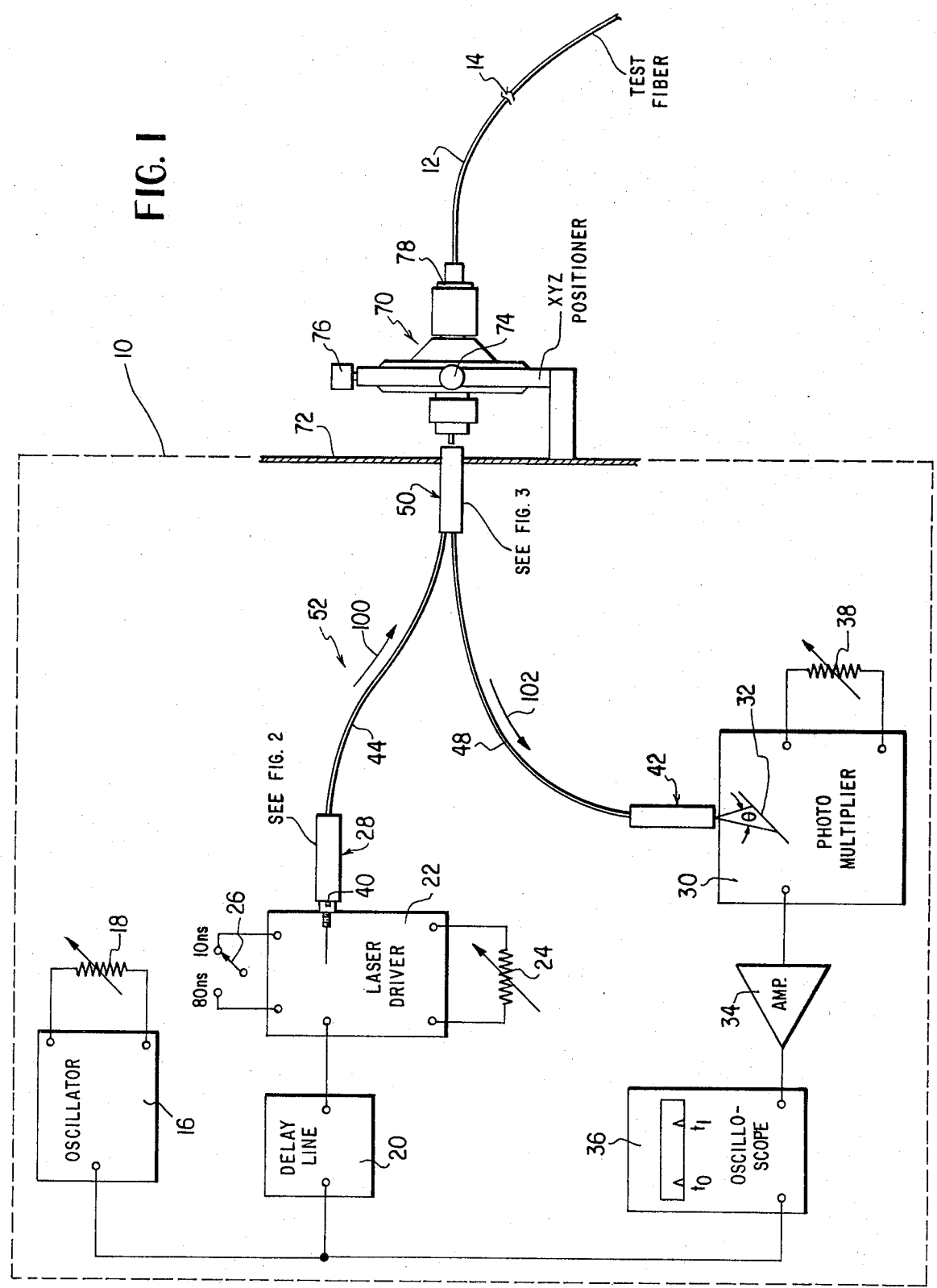
FIG. 1 is a block diagram of the optical time domain reflectometer of the present invention.

Referring to FIG. 1, there is shown an optical time domain reflectometer (OTDR) 10 coupled to an optical fiber waveguide 12 to be tested. For the purpose of description, the waveguide 12 is assumed to have a discontinuity therein in the form of a break 14, the OTDR being used to locate accurately the position of that break.

The OTDR consists of an oscillator 16 having a rate control 18 for controlling the frequency of pulse generation to between 100 and 10,000 pulses per second. The output of oscillator 16 is coupled through a 300 nanosecond delay line 20 to the input of an injection laser driver 22 having a pulse amplitude control 24 and a switch 26 for selecting either an 80 or a 10 nanosecond pulse. The output of driver 22 is connected across a gallium aluminum arsenide injection laser diode 40 (FIG. 2) mounted within a laser housing and coupling unit 28 threadably inserted in the laser driver 52.

The oscillator 16, delay line 20 and injection laser driver 22 may be built separately or are available as as a type ILC package from Power Technology Incorporated, Little Rock, Ark. The injection laser diode, which has a peak emission at about 800 nanometers, may be purchased from a number of sources, such as Laser Diode Laboratories, Inc., Metuchen, N.J., which manufacture a suitable GaAlAs single diode designated Series LA-60.

The OTDR 10 further comprises a photomultiplier 30 having a photocathode 32 connected through an amplifier 34 to the vertical input of an oscilloscope 36 which receives its sweep trigger from the output of oscillator 16. A suitable photomultiplier having a gain control 38 is the RCA C31034 or Hamamatsu R928. The oscilloscope is preferably a Tektronix or Hewlett Packard having a band width greater than 50 MHz. The components described thus far are conventional and commercially available.

The emitting surface of laser diode 40 is optically coupled to one end of an optical fiber strand 44 and the photomultiplier 30 is optically coupled to one end of a second optical fiber strand 48 by means of a detector coupling unit 42. The fiber strands 44 and 48 are joined together along a portion of their length in a manner to be explained hereinafter to form a composite portion 50, the strands 44, 48 and composite portion 50 comprising the optical coupler 52 of the present invention.

Figure 2:
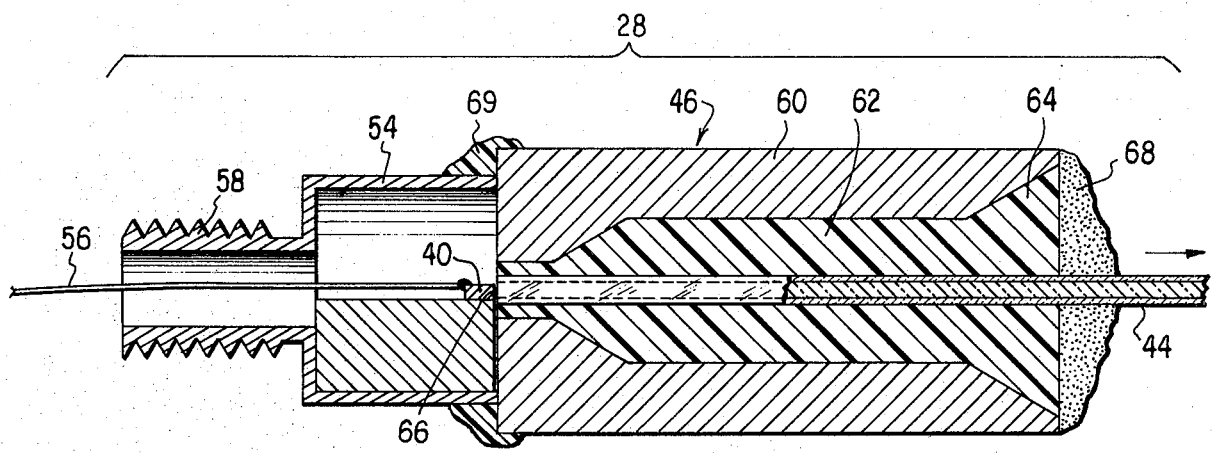
FIG. 2 is a sectional view of a termination device for optically coupling the injection laser to a fiber of an optical coupler.

Referring to FIG. 2, the laser housing and coupling unit 28 houses the injection laser diode 40 within a header 54 which acts as a heat sink. An electrically conducting lead 56, which passes through the header 54 and a threaded stem 58, connects the laser diode 40 to the output of the laser driver 22. The unit 28 further comprises an assembly 46 which consists of an aluminum cylinder 60 having a diameter of about 0.25 inch surrounding an epoxy sleeve 62 made, for example, of Emerson & Cuming #1217 epoxy resin. A longitudinal hole having a diameter of about 0.01 inch is provided in the sleeve 62 to permit insertion of the optical fiber 44, a tapered portion 64 being provided to facilitate insertion of the fiber 44.

During assembly, the optical fiber 44 is potted within the aluminum cylinder 60 and, after the epoxy 62 has hardened, the end surface 66 is polished flat with diamond dust polishing compound. The terminated fiber 44 is then proximity coupled to the laser 40 by first removing the glass window usually provided with commercially available lasers and then precisely aligning the core of fiber 44 to the injection laser using a fiber optical positioner. Alignment is carried out while monitoring the coupler for maximum output with the laser energized, precautions being taken to make certain that the optical fiber 44 does not touch the laser diode. The cylinder 60 is then permanently coupled to the laser header 54 with epoxy 69. A semi-soft material 68 such as Dow Corning Silastic 732RTV is used to stress relieve the fiber as it exits cylinder 60.

The unit 42, which optically couples the optical fiber 48 to the photomultiplier 30, is identical to the assembly 46 which couples the fiber 44 to the laser diode 40. After the fiber 48 has been secured within the epoxy sleeve and aluminum cylinder comprising the detector coupling element 42, the fiber is proximity coupled to the photomultiplier leaving a space of about 1/16" between the end of the detector coupling element 42 and photomultiplier 30 to prevent damage to the photomultiplier glass envelope. It has been found that if the output of the terminated fiber 48 radiates through a cone having an angle $\theta$ of 18°, determined by the fiber's numerical aperture, the photocathode 32 of photomultiplier 30 will fully capture the light without the need for an auxiliary focussing lens.

A fiber optic positioner 70 is attached, as shown in FIG. 1, to the outside of the front panel 72 of the OTDR 10. This positioner, which is commercially available as a type FP-1 from Newport Research Corporation permits precise translation of the test optical fiber 12 along the x, y and z axis by adjustment of knobs 74, 76 and 78 respectively. In the present invention, it is preferred to replace the plastic rod used in the commercially available positioner with a funnelled input glass capillary (not shown) having an inside diameter of about 150 $\mu$m for use with a fiber having an outside diameter of 100 to 150 $\mu$m.

The fiber waveguide 12 to be treated is prepared for measurement by baring the glass for about 2½" and cleaving the end 80 flat. (See FIG. 3). The end 80 is then inserted through the glass capillary in the fiber optic positioner 70 and butted against the end 82 of the composite portion 50 of the optical coupler 52 which protrudes from the panel 72 so that the test fiber 12 is coaxial with the composite portion. A small amount of a grease-like optical coupling compound having the same refractive index as the fiber glass is placed at the interface of the test fiber 12 and the optical coupler 52 to minimize the initial pulse amplitude and improve the coupling efficiency while being soft enough so that the test fiber 12 can be positioned easily by the positioner 70. A coupling compound manufactured by Dow Corning Corporation denoted as Q-2-3067 and having a refractive index of 1.466 has been used successfully as has mineral oil with a refractive index of 1.467. While the index matching grease is not essential for all applications, its use permits a fiber with an imperfect end to be tested.

Figure 3:
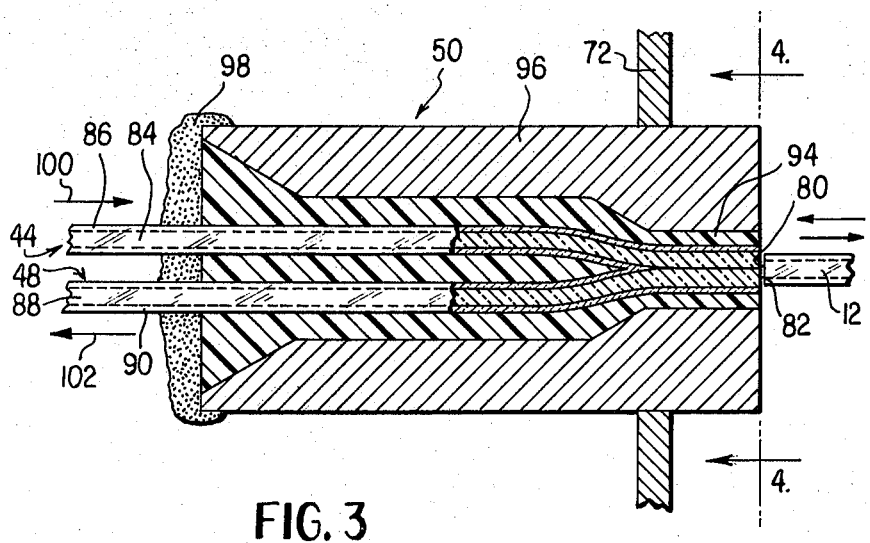
FIG. 3 is a side view of one embodiment of an optical coupler for use in the reflectometer of FIG. 1.
Figure 4:
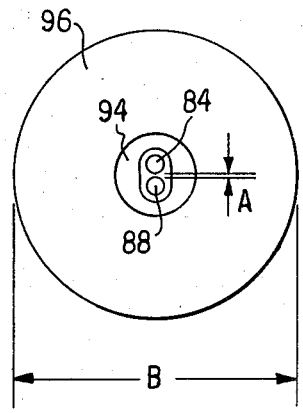
FIG. 4 is an end view of the coupler of FIG. 2 taken in the direction 4—4.

Referring to FIGS. 3 and 4, the composite portion 50 of the optical coupler 52 is depicted in greater detail. As shown, the fiber 44 consists of a centrally located circular core 84 surrounded by a cladding material 86 and, similarly, the fiber 48 consists of a centrally located circular core 88 surrounded by a cladding material 90. In a preferred embodiment, fibers 44 and 48 have a step-index profile wherein the refractive index $n_1$ of the cores 84 and 88 is greater than the refractive index $n_2$ of the claddings 86 and 90. In such fibers, optical energy propagation occurs through total internal reflection at the core/cladding interface.

The fibers 44, 48 may also be of the graded-index type wherein the refractive index decreases continuously with radial distance from the center of the fiber. In graded-index fibers, light propagation occurs through refraction, the light rays being continually bent toward the fiber's optical axis. Conventionally, the refractive index along the central axis of a graded-index fiber is a first value $n_1$ and changes parabolically with increasing radial distance to a lower value $n_2$ at the outer radius.

SA series step-index fibers manufactured by Fiber Communications Inc. a division of Times Fiber Communications Inc., Wallingford, Conn. have been found particularly useful for the present invention. These fibers employ a pure silica glass core having a 90 μm diameter and refractive index of 1.45 surrounded by a borosilicate glass cladding, the outer fiber diameter being on the order of 125 μm. Graded-index fibers manufactured by Corning have also been used successfully in fabrication of the optical coupler 52.

The composite portion 50 is fabricated by welding a portion of each of the fibers 44, 48 over a length of about 50 μm to 1000 μm with preferred length of 100 μm to 200 μm by use of an electric arc generated between electrodes energized by a high voltage AC source. The length over which the cores touch should be made as short as possible because, when a fiber is disturbed due to welding, flaws are unavoidably produced that tend to scatter light. In addition, the modes in the launch fiber tend to be coupled over to the receiver fiber if the length of the weld is too long.

Because of the small sizes of the components, welding is carried out under a microscope employing micropositioners. The welding is conducted at a temperature greater than that of the claddings 86, 90 and less than that of the cores 84, 88 thereby forming a composite structure in which the claddings 86 and 90 of fibers 44 and 48 fuse into a single continuous cladding structure 92 which surrounds and separates the cores 84 and 88.

The Times step-index fiber is well suited for producing the fused structure since the borosilicate glass cladding melts at about 600° C. whereas the silica glass core melts at 1200° C. The fusing step brings the cores 84 and 88 very close together, the distance A between them being less than 5 μm. It is important that the A dimension be made as small as possible and, ideally, the cores 84 and 88 should touch each other. By making A less than 5 μm, the coupling efficiency is maximized. In practice, the circular cores 84, 88 are brought together gradually until they touch, the A dimension not remaining constant along the longitudinal axes of the cores. It is important not to induce sudden bends in the fiber since this would result in increased losses.

Following fusing, the fused area is potted in an epoxy 94, which may be of the same composition as epoxy 62, and mounted within an aluminum cylinder 96. The end surface 82 is polished flat with a diamond dust polishing compound and a semisoft material 98, having the same composition as the material 68 used in conjunction with the laser and detector coupling elements 28 and 42, applied for stress relief to the end at which the fibers 44 and 48 enter the composite portion 50.

In a typical coupler, the diameter B of the aluminum case 96 is 6 mm.

After the end 80 of the optical waveguide 12 to be tested is cut square and mounted in the precision holding fixture 70 for alignment with the end 82 of the composite portion 50 and a drop of index matching fluid placed between the ends 80 and 82, the equipment is ready for operation. The pulse width, repetition rate and signal amplitude are selected by means of controls 26, 18 and 24 respectively and the diode 40 energized to transmit a pulse through the optical fiber 44 in the direction of arrow 100 to the optical waveguide 12 under test. An initial reference pulse is produced by reflection at the launch end 80 of the waveguide 12 and reflected back in the direction of arrow 102 to the photomultiplier 30. The amplitude of this reflected pulse is low and does not saturate detector 30. Detector 30 generates a pulse which is coupled by amplifier 34 to the oscilloscope 36 which displays the pulse at time $t_0$. The 300 μsec delay line 20 assures that the $t_0$ pulse is fully displayed.

The break 14 in the waveguide 12 produces a reflected pulse due to the air/glass interface mismatch in the refractive index. This reflected pulse reaches detector 30 at time $t_1$ thereby permitting the location of the break to be accurately determined from the equation $$d = [c(t_1 - t_0)]/2n,$$

where d is the distance to the break 14, c is the speed of light in a vacuum, $t_0$ is the instant at which the light pulse was injected into the optical fiber, $t_1$ is the instant at which the reflected pulse is received by the detector and n is the refractive index of the optical fiber. Alternatively, the distance d can be determined by the approximation that one microsecond time difference is equal to about 100 meters of optical fiber. The measurement can be made to ±0.002% using a Hewlett Packard 1743A 100 Mhz crystal controlled time base and to a few percent using a standard oscilloscope.

The OTDR of the present invention can be used to detect discontinuities in an optical cable having a length greater than 4 km, for a 63 μm core and an attenuation of 5 db/km. An injected pulse having an 800 nanometer wavelength, 10 nanoseconds pulse width and peak power of 0.2 watt produces a reflected signal having an amplitude greater than 2 volts and a pulse width of less than 15 nanoseconds from the far end of a 1 km long, 63 μm core, 10 db/km, 200 MHz-km test fiber having a 4% Fresnel reflection. The resolution is better than 5 cm for a single reflection.

Figure 5:
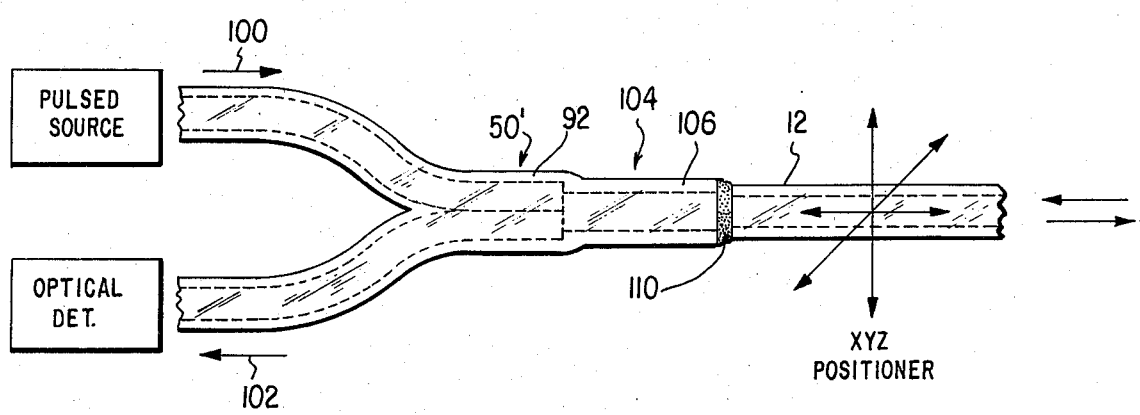
FIG. 5 is a side view of another embodiment of an optical coupler for use in the reflectometer of FIG. 1.

FIG. 5 shows another embodiment of the invention in which a section 104 is butt welded onto the side-by-side weld of FIG. 3. As shown the welding is carried out so that the cladding 106 of the section 104 merges with the cladding 92. In FIG. 5, the xyz positioner 70 is illustrated schematically and the index matching fluid between the test waveguide 12 and the section 104 is represented by the numeral 110.

What is claimed is:
1. An optical time domain reflectometer for determining the location of a discontinuity in an optical fiber waveguide comprising
   a pulsed light source,
   an optical detector, and
   optical coupling means for coupling said optical fiber waveguide to said pulsed light source and said optical detector, said optical coupling means including first and second optical fibers each having a central core surrounded by cladding material, one end of said first optical fiber being positioned adjacent said pulsed light source and one end of said second optical fiber being positioned adjacent said optical detector, portions of the cladding material of each of said first and second optical fibers extending from the other ends of said fibers being fused together to form a composite portion wherein the central cores of said first and second optical fibers are circular, touching and surrounded by a continuum of cladding material, said optical fiber waveguide being positioned adjacent the end of said composite portion and coaxial therewith.

2. An optical time domain reflectometer as defined by claim 1 which further comprises a third optical fiber having one end fused to the end of the composite portion of said optical coupling means, said third optical fiber having a central core surrounded by cladding material of said third optical fiber forming a continuum with the cladding material of said composite portion, said optical fiber waveguide being positioned adjacent the other end of said third optical fiber.

3. An optical time domain reflectometer as defined by claim 1 which further comprises means for adjusting the position of said optical fiber waveguide to align said waveguide with the composite portion of said optical coupling means.

4. An optical time domain reflectometer as defined by claim 1 or 2 wherein a coupling compound is interposed between said optical fiber waveguide and said composite portion.

5. An optical coupler for coupling an injection laser diode and photodetector to an optical fiber waveguide comprising first and second optical fibers each having a central core surrounded by cladding material, one end of said first optical fiber being positioned adjacent said pulsed light source and one end of said second optical fiber being positioned adjacent said optical detector, portions of the cladding material of each of said first and second optical fibers extending from the other ends of said fibers being fused together to form a composite portion wherein the central cores of said first and second optical fibers are circular, touching and surrounded by a continuum of cladding material, said optical fiber waveguide being positioned adjacent the end of said composite portion and coaxial therewith.

6. An optical coupler as defined by claim 5 wherein said first and second optical fibers are fused together in said composite portion over a length of between 50 $\mu$m and 1000 $\mu$m.

7. An optical coupler as defined by claim 5 wherein said first and second optical fibers are fused together in said composite portion over a preferred length of between 100 $\mu$m to 200 $\mu$m.

* * * * *